(12) United States Patent
Schmitt

(10) Patent No.: US 12,738,864 B2
(45) Date of Patent: Sep. 15, 2026

(54) MODULE OF A MODULAR MULTILEVEL CONVERTER

(71) Applicant: Siemens Energy Global GmbH & Co. KG, Munich (DE)

(72) Inventor: Daniel Schmitt, Postbauer-Heng (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 164 days.

(21) Appl. No.: 18/838,125

(22) PCT Filed: Feb. 16, 2022

(86) PCT No.: PCT/EP2022/053765
§ 371 (c)(1),
(2) Date: Aug. 13, 2024

(87) PCT Pub. No.: WO2023/155979
PCT Pub. Date: Aug. 24, 2023

(65) Prior Publication Data
US 2025/0149998 A1 May 8, 2025

(51) Int. Cl.
*H02M 7/483* (2007.01)
*H02M 1/32* (2007.01)
*H02M 7/00* (2006.01)

(52) U.S. Cl.
CPC ......... *H02M 7/4835* (2021.05); *H02M 1/322* (2021.05); *H02M 1/325* (2021.05); *H02M 7/003* (2013.01)

(58) Field of Classification Search
CPC .... H02M 7/4835; H02M 1/325; H02M 1/322; H02M 7/003
See application file for complete search history.

(56) References Cited

U.S. PATENT DOCUMENTS 9,525,348 B1 12/2016 Aeloiza et al.
10,461,663 B2 * 10/2019 Dorn ....................... H02M 7/49
11,320,493 B2 * 5/2022 Stahlhut ................... H02H 3/20
(Continued)

FOREIGN PATENT DOCUMENTS

EP 3485565 B1 5/2020
EP 3622619 B1 2/2021
EP 3796540 A1 3/2021

*Primary Examiner* — Adolf D Berhane
(74) *Attorney, Agent, or Firm* — Laurence A. Greenberg; Werner H. Stemer; Ralph E. Locher

(57) ABSTRACT

A module of a modular multi-level converter includes a first module terminal, a second module terminal, a first electrical conductor, a second electrical conductor, a third electrical conductor, a power semiconductor circuit and an electrical energy storage unit. The power semiconductor circuit has a first electronic switching element and a second electronic switching element. A first diode is connected in anti-parallel with the first electronic switch element and a second diode is connected in anti-parallel with the second electronic switching element. The power semiconductor circuit is connected to the energy storage unit by the first electrical conductor and the second electrical conductor. The first module terminal is connected to the third electrical conductor. A first thyristor and a second thyristor are connected between the third electrical conductor and the second electrical conductor, The first thyristor and the second thyristor forming an anti-parallel circuit.

12 Claims, 4 Drawing Sheets

(56) References Cited

U.S. PATENT DOCUMENTS

| | | | | |
|---|---|---|---|---|
| 11,652,401 | B2 * | 5/2023 | Lee | H02M 1/322<br>363/13 |
| 12,255,546 | B2 * | 3/2025 | Ota | H02M 1/32 |

* cited by examiner 1
16
+
Control
Device
35
37
37
37
1_n
1_5
1_4
1_3
1_2
1_1
3_n
3_5
3_4
3_3
3_2
3_1
5_n
5_5
5_4
5_3
5_2
5_1
Submodules
Submodules
212
215
11
18
27
5
7
9
2_n
2_5
2_4
2_3
2_2
2_1
4_n
4_5
4_4
4_3
4_2
4_1
6_n
6_5
6_4
6_3
6_2
6_1
Submodules
Submodules
13
21
29
15
24
31
17
−

Electronic Module
Control Device
201
Control
Device
212
202
204
37
210
206
208
35
220
215

Electronic Module
Control Device
301
Control
Device
212
202
204
302
304
37
210
206
208
306
308
35
220
315

603
625
201
624
212
626
621
Electrical Energy Storage Unit
Power Semiconductor Circuit
+
626
623
605
210
630
635
215
632
−
626
622
Semiconductor Wafer Power Semiconductor Circuit
Electrical Energy Storage Unit
201
603
605
625
624
212
626
621
715
212
+
204
202
626
623
210
630
206
701
702
208
708
705
215
215
−
626
622
715

MODULE OF A MODULAR MULTILEVEL CONVERTER

FIELD AND BACKGROUND OF THE INVENTION

The invention relates to a module of a multilevel converter and a method for discharging an electrical energy storage unit in a module of this kind.

A module of a modular multilevel converter often has a bypass switch, which can be used to electrically bypass the module terminals in the event of a fault arising inside the module. This makes it possible to continue operation of the modular multilevel converter without the faulty module.

If a modular multilevel converter is being operated as a rectifier and a short circuit arises on the DC side, the short-circuit current that arises can then flow through at least one of the diodes inside the module, which are each connected in antiparallel with the electronic switching elements, and can overload said diode. It is therefore conceivable to relieve the load on the diodes in the event of a fault by means of an additional component. The majority of the fault current that arises can then flow through the additional component and only a small portion of the fault current flows via the diode.

In order to equip a module in such a way, a bypass switch and an additional component would thus be required.

SUMMARY OF THE INVENTION

The invention is based on the object of specifying a module of a modular multilevel converter and a method for discharging an electrical energy storage unit in a module of this kind in which the module can be structured in a compact manner.

This object is achieved according to the invention by a module and a method as claimed in the independent patent claims. Advantageous embodiments of the module and the method are specified in the dependent patent claims.

The invention discloses a module of a modular multilevel converter

- comprising a first module terminal, a second module terminal, a first electrical conductor, a second electrical conductor, a third electrical conductor, a power semiconductor circuit and an electrical energy storage unit,
- wherein the power semiconductor circuit has a first electronic switching element and a second electronic switching element, wherein a first diode is connected in antiparallel with the first electronic switching element and a second diode is connected in antiparallel with the second electronic switching element,
- wherein the power semiconductor circuit is connected to the energy storage unit by means of the first electrical conductor and the second electrical conductor,
- the first module terminal is connected to the third electrical conductor, and
- a first thyristor and a second thyristor are connected between the third electrical conductor and the second electrical conductor, wherein the first thyristor and the second thyristor form an antiparallel circuit. In other words, the first thyristor and the second thyristor are connected in antiparallel with one another. In this case, it is advantageous that the antiparallel circuit of the first thyristor and the second thyristor can be structured in a very compact and therefore space-saving manner. The first thyristor can then take on the function of the bypass switch; the second thyristor is used to discharge at least one of the diodes.

The module can be designed such that

- the third electrical conductor is arranged (in an intermediate space) between the first electrical conductor and the second electrical conductor.

This also enables a compact structure.

The module can be designed such that

- the first thyristor and the second thyristor are arranged (in an intermediate space) between the third electrical conductor and the second electrical conductor.

In other words, the two thyristors are arranged in an antiparallel circuit in the intermediate space between the third electrical conductor and the second electrical conductor, wherein one pole of the antiparallel circuit is electrically connected to the third electrical conductor and a second pole of the antiparallel circuit is electrically connected to the second electrical conductor.

The module can be designed such that

- the first thyristor and the second thyristor are mechanically braced between the third electrical conductor and the second electrical conductor.

As a result, forces (current forces) arising in the case of high currents can also be controlled.

The module can be designed such that

- the first thyristor and the second thyristor are arranged (in an intermediate space) between the first electrical conductor and the second electrical conductor.

As a result, the first thyristor and the second thyristor are located in the region in which the magnetic fields that change over time and arise around the first electrical conductor and the second electrical conductor are particularly strong.

The module can be designed such that

- the first thyristor and the second thyristor are in the form of a (single) semiconductor component.

This saves space and wiring outlay.

The module can be designed such that

- the semiconductor component has a disk-type thyristor housing. In particular, the disk-type thyristor housing is mechanically braced between the third electrical conductor and the second electrical conductor.

This enables secure fastening of the two thyristors.

The module can be designed such that

- the first thyristor is arranged (spatially or in the intermediate space) between the first electrical conductor and the second electrical conductor in such a way that a current that switches on the first thyristor is induced in the semiconductor material due to a magnetic field that changes over time, said magnetic field arising due to a discharge current of the energy storage unit that flows through the first electrical conductor and/or the second electrical conductor and permeating the semiconductor material of the first thyristor.

In this case, the first thyristor may be in particular the thyristor whose forward direction corresponds to the forward direction of the second electronic switching element. The module can thus be designed in particular such that the induced current switches on the thyristor of the antiparallel-connected thyristors whose forward direction corresponds to the forward direction of the second electronic switching element.

It the first thyristor and the second thyristor are in the form of a (single) semiconductor component, then the module can be designed such that the semiconductor component is arranged (spatially or in the intermediate space) between the first electrical conductor and the second electrical conductor in such a way that a current that switches on at least one of the antiparallel-connected thyristors of the semiconductor component is induced in the semiconductor material due to a magnetic field that changes over time, said magnetic field arising due to a discharge current of the energy storage unit that flows through the first electrical conductor and/or the second electrical conductor and permeating the semiconductor material of the semiconductor component. In particular, the induced current can switch on the first thyristor.

The module can be designed such that the first electrical conductor, the second electrical conductor and/or the third electrical conductor are each in the form of an (in particular flat) busbar.

As a result, in particular, the magnetic field that changes over time arising due to the current flow through the first electrical conductor and the second electrical conductor can permeate the semiconductor material of the first thyristor and/or the second thyristor particularly well. Furthermore, a busbar of this type can also be used to safely conduct a high discharge current of the energy storage unit. The thyristors can be mechanically stably braced at a busbar.

The module can be designed such that the first thyristor is integrated in a (disk-shaped) semiconductor wafer.

The module can also be designed such that the first thyristor and the second thyristor are (jointly) integrated in a (single or joint) disk-shaped semiconductor wafer.

As a result, the antiparallel circuit of the thyristors can be realized in a particularly compact and cost-effective manner.

The module can be designed such that the first electrical conductor, the second electrical conductor and/or the third electrical conductor each have a flat outer surface, the semiconductor material of the first thyristor is arranged in a disk-shaped semiconductor wafer and the disk-shaped semiconductor wafer is arranged in parallel with at least one of the flat outer surfaces.

As a result, the current can be induced in the semiconductor material particularly well.

In this case, in particular, the first electrical conductor can have a first flat outer surface, the second electrical conductor can have a second flat outer surface, the first flat outer surface can be arranged parallel to the second flat outer surface, the semiconductor material of the thyristor can form the disk-shaped semiconductor wafer (that is to say a disk) and the disk-shaped semiconductor wafer can be arranged parallel to the first flat outer surface and to the second flat outer surface. An arrangement of this kind advantageously makes a small distance between the first electrical conductor and the second electrical conductor possible. As a result, a particularly strong magnetic field can be produced between the first electrical conductor and the second electrical conductor. Furthermore, it has been shown that the magnetic field that changes over time permeates the semiconductor material of the thyristor particularly well in an arrangement of this kind, such that the current (which acts as a gate current) is reliably induced in the semiconductor material of the thyristor.

The module can be designed such that the first electronic switching element and the second electronic switching element are interconnected to form a half-bridge circuit.

In this case, the half-bridge circuit can be connected in parallel with the energy storage unit. However, in particular, the half-bridge circuit can also be part of a larger circuit, for example part of a full-bridge circuit. The module may thus be for example a half-bridge module or a full-bridge module.

The invention also discloses a modular multilevel converter comprising a plurality of modules of this kind.

The invention furthermore discloses a method for discharging an electrical energy storage unit in a module of a modular multilevel converter, wherein the module comprises a first module terminal, a second module terminal, a first electrical conductor, a second electrical conductor, a third electrical conductor, a power semiconductor circuit and an electrical energy storage unit, wherein the power semiconductor circuit has a first electronic switching element and a second electronic switching element, wherein a first diode is connected in antiparallel with the first electronic switching element and a second diode is connected in antiparallel with the second electronic switching element, wherein the power semiconductor circuit is connected to the energy storage unit by means of the first electrical conductor and the second electrical conductor, the first module terminal is connected to the third electrical conductor, and a first thyristor and a second thyristor are connected between the third electrical conductor and the second electrical conductor, wherein the first thyristor and the second thyristor form an antiparallel circuit, wherein, in the method, a current is induced in the semiconductor material due to a magnetic field that changes over time, said magnetic field arising due to a discharge current of the energy storage unit that flows through the first electrical conductor and/or the second electrical conductor and permeating the semiconductor material of the first thyristor, as a result of which the first thyristor is switched on.

In this case, the first thyristor may be in particular the thyristor whose forward direction corresponds to the forward direction of the second electronic switching element. The method can thus proceed in particular such that the (induced) current switches on the thyristor of the antiparallel—connected thyristors whose forward direction corresponds to the forward direction of the second electronic switching element.

The method can proceed such that the energy storage unit is immediately discharged in the event of a fault arising in the module, as a result of which the discharge current of the energy storage unit begins to flow, and the first module terminal and the second module terminal are short-circuited by means of the switched-on first thyristor.

In the case of the module and the method, it is particularly advantageous that the magnetic field that changes over time (and that arises due to the increasing discharge current of the energy storage unit) is directly used to switch on the first thyristor (that is to say to ignite the first thyristor). No other components and no other evaluation circuit either are necessary for this. As a result, this method can be realized in a very simple, cost-effective and reliable manner. Furthermore, time delays when switching on the thyristor are avoided. An evaluation circuit consisting of additional electronic components would of course involve delays of this kind. It is thus a self-igniting thyristor without an additional switching delay time due to additional detection or ignition electronics in an additional evaluation circuit that is involved here. No additional electrical losses occur either due to the absence of additional components and an additional evaluation circuit. In particular, in the case of a modular multilevel converter in which there are a great number of modules, the electrical losses can thus be significantly reduced. As a result, the energy efficiency of the system can be improved.

The module and the method thus make it possible to save costs and reduce the FIT rate (FIT=failure in time) due to avoiding additional electronic components and avoiding an additional electronic evaluation circuit. Since the components that are not present cannot malfunction, the likelihood of a fault arising is significantly reduced.

The module can be structured very compactly by using the first thyristor and the second thyristor in an antiparallel circuit. The module can be structured particularly compactly if the first thyristor and the (antiparallel) second thyristor are arranged in a single semiconductor component. In particular, this can also result in a weight reduction and a cost saving.

The module and the method have identical or similar advantages.

The invention is explained in more detail below with reference to exemplary embodiments. Identical reference signs refer here to identical or identically acting elements.

DETAILED DESCRIPTION OF THE INVENTION

Figure 1:
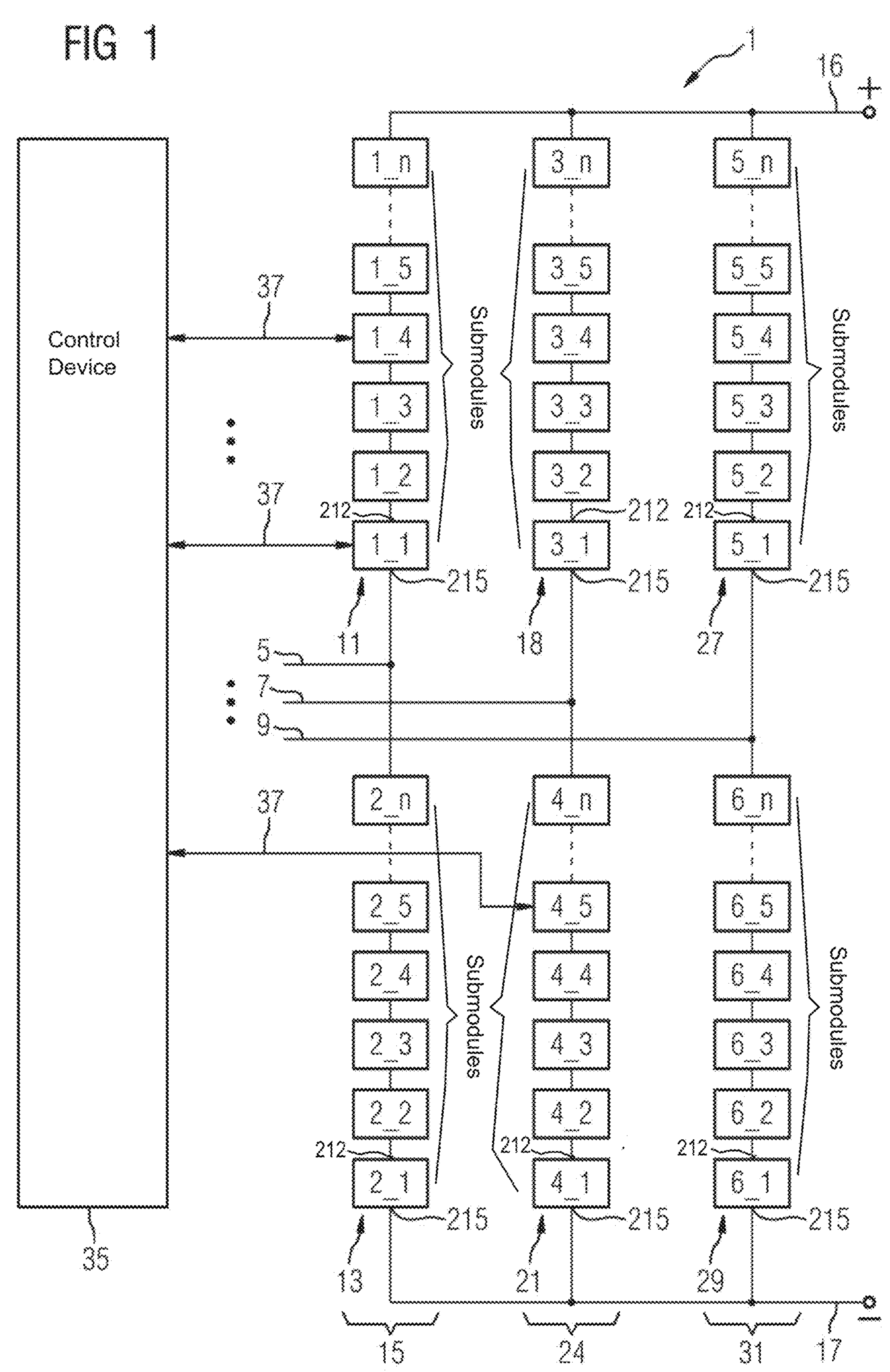
FIG. 1 illustrates an exemplary embodiment of a converter having a plurality of modules.

FIG. 1 illustrates a converter 1 in the form of a modular multilevel converter 1 (MMC). Said multilevel converter 1 has a first AC voltage terminal 5, a second AC voltage terminal 7 and a third AC voltage terminal 9. The first AC voltage terminal 5 is electrically connected to a first phase module branch 11 and a second phase module branch 13. The first phase module branch 11 and the second phase module branch 13 form a first phase module 15 of the converter 1. The end of the first phase module branch 11 furthest from the first AC voltage terminal 5 is electrically connected to a first DC voltage terminal 16; the end of the second phase module branch 13 furthest from the first AC voltage terminal 5 is electrically connected to a second DC voltage terminal 17. The first DC voltage terminal 16 is a positive DC voltage terminal; the second DC voltage terminal 17 is a negative DC voltage terminal.

The second AC voltage terminal 7 is electrically connected to one end of a third phase module branch 18 and to one end of a fourth phase module branch 21. The third phase module branch 18 and the fourth phase module branch 21 form a second phase module 24. The third AC voltage terminal 9 is electrically connected to one end of a fifth phase module branch 27 and to one end of a sixth phase module branch 29. The fifth phase module branch 27 and the sixth phase module branch 29 form a third phase module 31.

The end of the third phase module branch 18 furthest from the second AC voltage terminal 7 and the end of the fifth phase module branch 27 furthest from the third AC voltage terminal 9 are electrically connected to the first DC voltage terminal 16. The end of the fourth phase module branch 21 furthest from the second AC voltage terminal 7 and the end of the sixth phase module branch 29 furthest from the third AC voltage terminal 9 are electrically connected to the second DC voltage terminal 17.

Each phase module branch has a plurality of modules (1_1, 1_2, 1_3, 1_4 . . . 1_n; 2_1 . . . 2_n; etc.), which are electrically connected in series (by means of the galvanic current terminals thereof). Modules of this kind are also referred to as submodules. In the exemplary embodiment of FIG. 1, each phase module branch has n modules. The number of modules electrically connected in series by means of the galvanic current terminals thereof may be very different, at least three modules are connected in series; however, for example 50, 100 or more modules can also be electrically connected in series. In the exemplary embodiment, n=36: the first phase module branch 11 thus has 36 modules 1_1, 1_2, 1_3, . . . 1_36. The other phase module branches 13, 18, 21, 27 and 29 have a similar structure.

In the left-hand region of FIG. 1, a control device 35 for the modules 1_1 to 6_n is schematically illustrated. Optical messages are transmitted from said central control device 35 via an optical communication connection 37 (for example via an optical waveguide) to the individual modules. The message transmission between the control device and a module is illustrated in each case symbolically by a line 37; the direction of the message transmission is symbolized by the arrow heads on the lines 37.

This is illustrated using the example of the modules 1_1, 1_4 and 4_5; messages are sent to the other modules and messages are received by said modules in the same way. By way of example, the control device 35 sends to each of the individual modules a target value for the level of the output voltage that is to be provided by the respective module.

Figure 2:
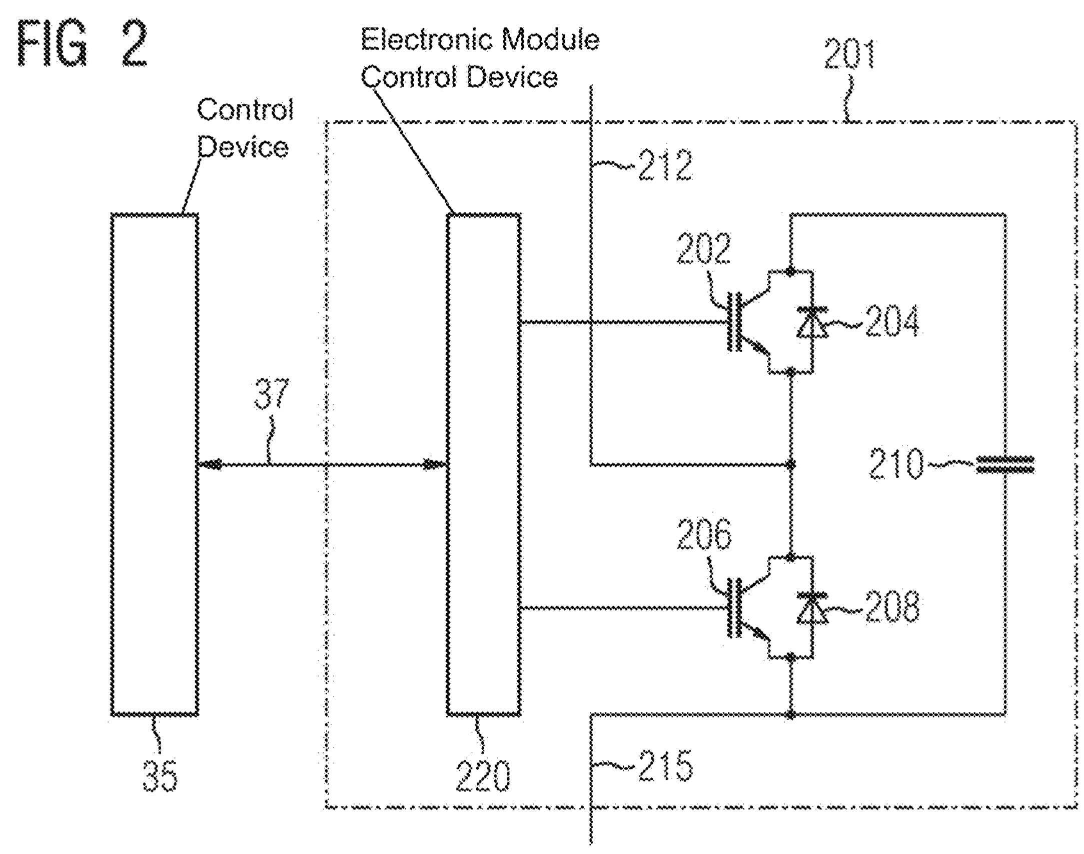
FIG. 2 illustrates an exemplary embodiment of a module.

FIG. 2 illustrates by way of example the structure of a module 201. This module may be for example the module 1_1 of the first phase module branch 11 (or else one of the other modules illustrated in FIG. 1). The module is in the form of a half-bridge module 201. The module 201 has a first electronic switching element 202 that can be switched on and off (switching element 202 that can be switched on and off) comprising a first antiparallel-connected diode 204. The module 201 furthermore has a second electronic switching element 206 that can be switched on and off (switching element 206 that can be switched on and off) comprising a second antiparallel-connected diode 208 and has an electrical energy storage unit 210 in the form of a capacitor 210. The first electronic switching element 202 and the second electronic switching element 206 are each in the form of an IGBT (insulated-gate bipolar transistor). The first electronic switching element 202 is electrically connected in series with the second electronic switching element 206. A first galvanic module terminal 212 is arranged at the connecting point between the two electronic switching elements 202 and 206. A second galvanic module terminal 215 is arranged at the terminal of the second switching element 206, which is opposite the connecting point. The second module terminal 215 is furthermore connected to a first terminal of the energy storage unit 210; a second terminal of the energy storage unit 210 is electrically connected to the terminal of the first switching element 202, which is opposite the connecting point.

The energy storage unit 210 is thus electrically connected in parallel with the series circuit composed of the first switching element 202 and the second switching element 206. Appropriate actuation of the first switching element 202 and the second switching element 206 by way of an electronic module control device 220 inside the module can achieve a situation in which either the voltage of the energy storage unit 210 is output or no voltage is output (that is to say a zero voltage is output) between the first galvanic module terminal 212 and the second galvanic module terminal 215. Interaction of the modules of the individual phase module branches can thus produce the output voltage of the converter desired in each case.

Figure 3:
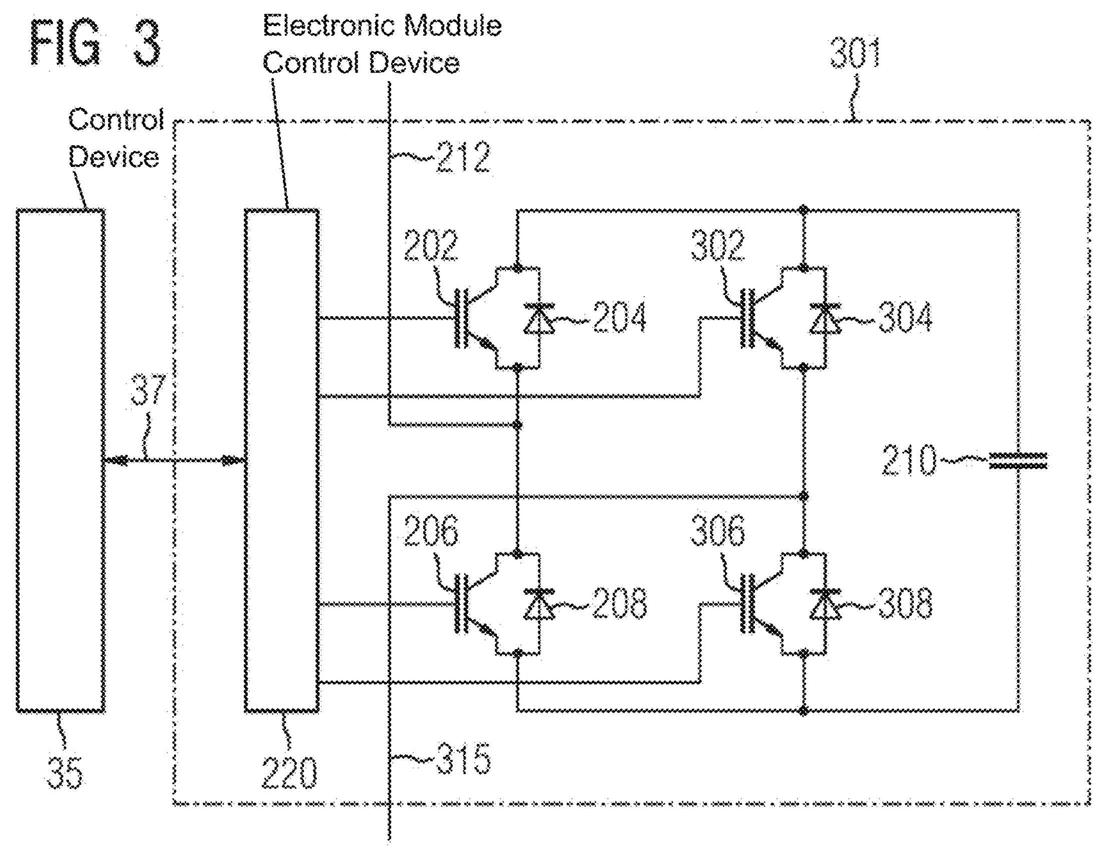
FIG. 3 illustrates another exemplary embodiment of a module.

FIG. 3 illustrates another exemplary embodiment of a module 301 of the modular multilevel converter 1. This module 301 may be for example the module 1_2 (or else one of the other modules illustrated in FIG. 1). In addition to the first switching element 202, second switching element 206, first diode 204, second diode 208 and energy storage unit 210 already known from FIG. 2, the module 301 illustrated in FIG. 3 has a third electronic switching element 302 that can be switched on and off having an antiparallel-connected third diode 304 and has a fourth electronic switching element 306 that can be switched on and off having an antiparallel-connected fourth diode 308. The third switching element 302 that can be switched on and off and the fourth switching element 306 that can be switched on and off are each in the form of an IGBT. In contrast to the circuit of FIG. 2, the second galvanic module terminal 315 is not electrically connected to the second switching element 206 but instead to a center point of an electrical series circuit composed of the third switching element 302 and the fourth switching element 306.

The module 301 of FIG. 3 is what is known as a full-bridge module 301. This full-bridge module 301 is characterized in that, with appropriate actuation of the four switching elements, either the positive voltage of the energy storage unit 210, the negative voltage of the energy storage unit 210 or a voltage with the value zero (zero voltage) can be output selectively between the first galvanic module terminal 212 and the second galvanic module terminal 315. It is therefore possible to reverse the polarity of the output voltage by means of the full-bridge module 301. The converter 1 can have either only half-bridge modules 201, only full-bridge modules 301 or else half-bridge modules 201 and full-bridge modules 301. Large electrical currents of the converter flow via the first galvanic module terminal 212 and the second galvanic module terminal 215, 315.

Figure 4:
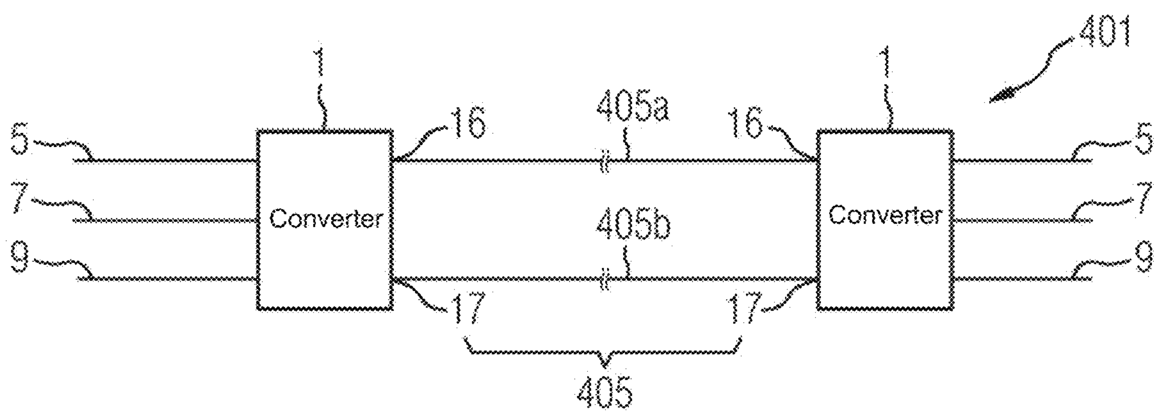
FIG. 4 illustrates an exemplary embodiment of a high-voltage direct current transmission system.

FIG. 4 schematically illustrates an exemplary embodiment of a high-voltage direct current transmission system 401. This high-voltage direct current transmission system 401 has two converters 1, as are illustrated in FIG. 1. These two converters 1 are electrically connected to one another on the DC voltage side by way of a high-voltage direct current connection 405. In this case, the two positive DC voltage terminals 16 of the converter 1 are electrically connected to one another by means of a first high-voltage direct current line 405*a*; the two negative DC voltage terminals 17 of the two converters 1 are electrically connected to one another by means of a second high-voltage direct current line 405*b*. Electrical energy can be transmitted over long distances by means of a high-voltage direct current transmission system 401 of this kind; the high-voltage direct current connection 405 then has a corresponding length.

Figure 5:
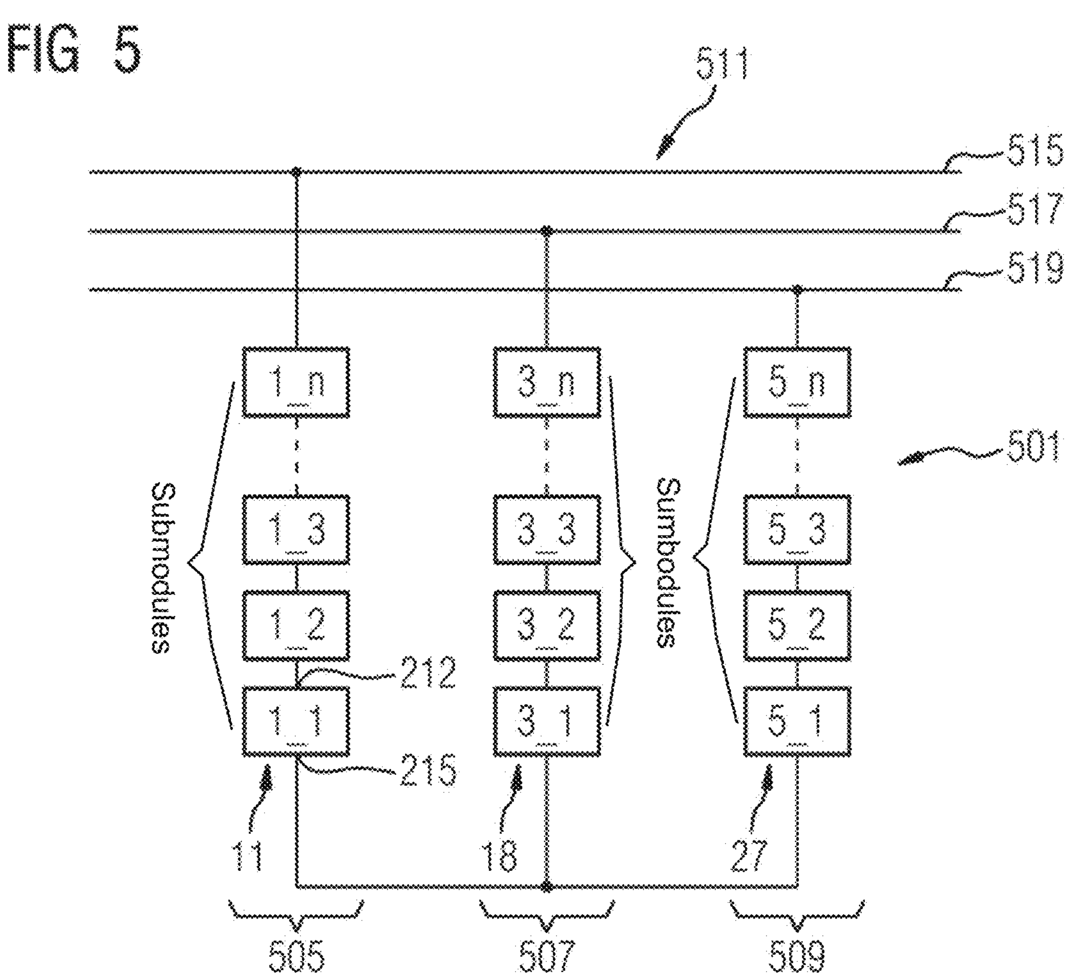
FIG. 5 illustrates an exemplary embodiment of a reactive power compensation System.

FIG. 5 illustrates an exemplary embodiment of a converter 501 that is used as a reactive power compensator 501. This converter 501 has only the three phase module branches 11, 18 and 27 that form three phase modules 505, 507 and 509 of the converter. The number of phase modules 505, 507 and 509 corresponds to the number of phases of an AC voltage network 511 to which the converter 501 is connected.

The three phase module branches 11, 18 and 27 are connected to one another in star. The end of the three phase module branches opposite the start point is electrically connected to a respective phase line 515, 517 and 519 of the three-phase AC voltage network 511. In another exemplary embodiment, the three phase modules 505, 507 and 509 can also be connected in delta instead of in star. The converter 501 can supply reactive power to the AC voltage network 511 or can draw reactive power from the AC voltage network 511.

Figure 6:
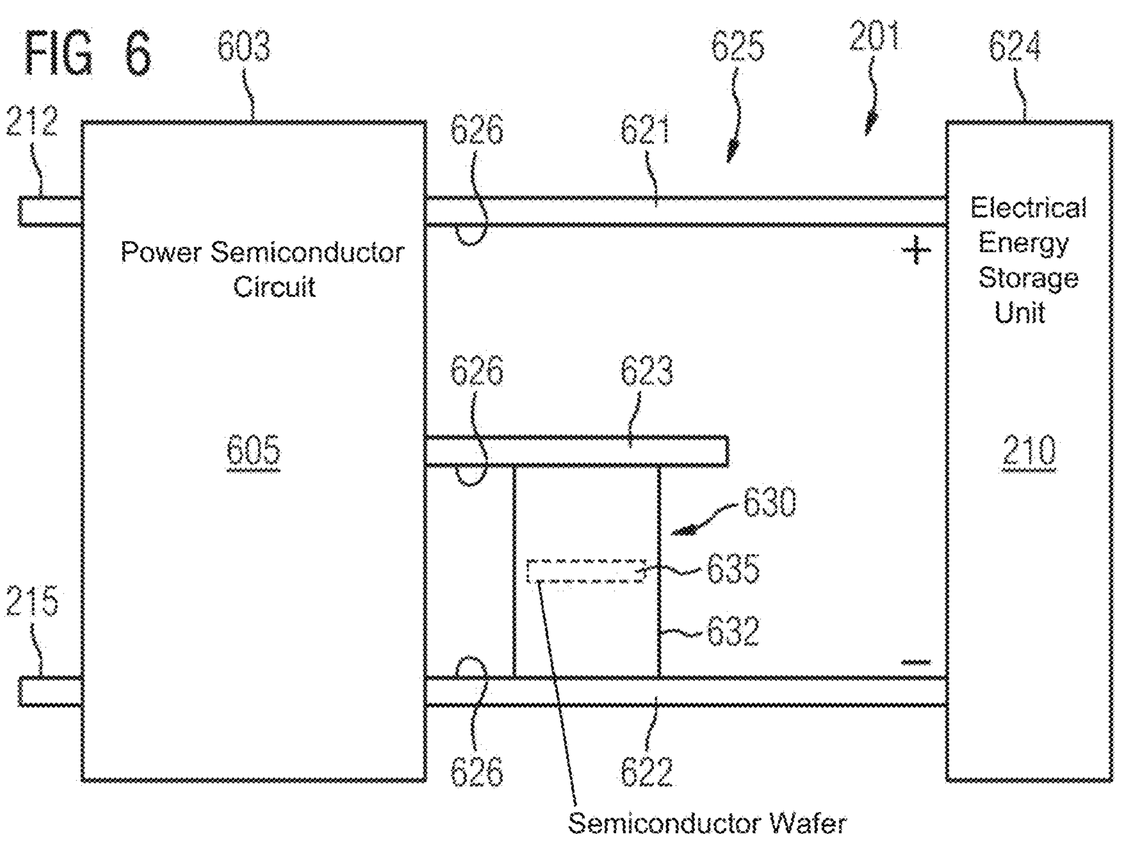
FIG. 6 illustrates an exemplary embodiment of a module comprising two antiparallel-connected thyristors and FIG. 7 illustrates the module from FIG. 6 with further exemplary details.

FIG. 6 illustrates an example of the structural design of the module 201. A housing 603 comprising a power semiconductor circuit 605, not illustrated in any more detail, has the first module terminal 212 and the second module terminal 215. The power semiconductor circuit 605 is electrically connected to the electrical energy storage unit 210, not illustrated in any more detail, by means of a first electrical conductor 621 and a second electrical conductor 622. The electrical energy storage unit 210 is arranged in an energy storage unit housing 624. A third electrical conductor 623 is arranged in an intermediate space between the first electrical conductor 621 and the second electrical conductor 622. In the exemplary embodiment, the first electrical conductor 621, the second electrical conductor 622 and the third electrical conductor 623 are each in the form of a busbar. Each of said busbars has in particular a flat profile. The first electrical conductor, the second electrical conductor and/or the third electrical conductor thus each have at least one flat outer surface 626.

The first electrical conductor 621, the second electrical conductor 622 and the third electrical conductor 623 are thus arranged in the region between the power semiconductor circuit 605 and the electrical energy storage unit 210. This region can be referred to as the DC voltage busbar region 625.

Figure 7:
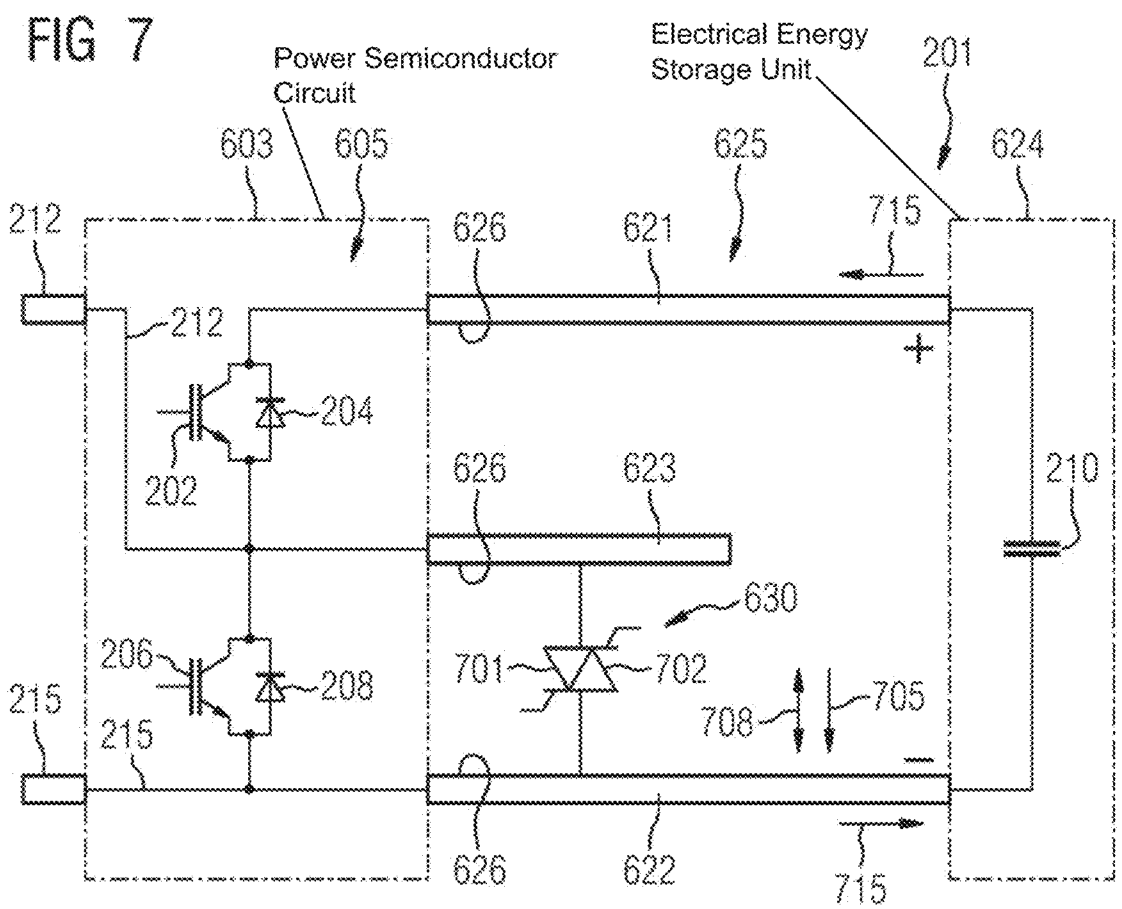

A thyristor element 630 is arranged between the third electrical conductor 623 and the second electrical conductor 622. The thyristor element 630 is located in the region 625 of the DC voltage busbars, that is to say in the DC voltage busbar region 625. The thyristor element 630 has an antiparallel circuit comprising a first thyristor 701 and a second thyristor 702, as can be seen in FIG. 7.

In the exemplary embodiment, the thyristor element is in the form of a disk-type thyristor 630. The disk-type thyristor is mechanically braced in particular between the third electrical conductor 623 and the second electrical conductor 622. The third electrical conductor 623, the thyristor element 630 and the second electrical conductor 622 form a tensioning brace. This tensioning brace (or the mechanical tensioning system) achieves good electrical contact between the third electrical conductor 623, the thyristor element 630 and the second electrical conductor 622. Furthermore, the electrical contact-connection of the thyristor element 630 is so mechanically stable due to the bracing system or the tensioning brace that the electrical contact-connection can reliably take up the current forces that appear due to a large discharge current.

In the exemplary embodiment, the thyristor element 630 is in the form of a disk-type thyristor; the thyristor element 630 has a disk-type thyristor housing 632. In other words, the thyristor element 630 has a circular cylindrical shape with a round base surface and a round top surface. Thyristor elements or thyristors in the form of disk-type thyristors can be used in particular to realize mechanically stable tensioning braces.

The thyristor element 630 has a disk-shaped semiconductor wafer 635 containing the semiconductor material of the first thyristor 701 and in particular also the semiconductor material of the second thyristor 702. The first thyristor 701 is thus integrated into the semiconductor wafer 635, in particular the first thyristor 701 and the second thyristor 702 are integrated in a single or joint semiconductor wafer 635.

The semiconductor wafer 635 forms a disk (disk-shaped semiconductor material, semiconductor material disk). The semiconductor wafer 635 is illustrated in cross section. In the side view, the semiconductor wafer 635 has a circular shape.

The first electrical conductor 621, the second electrical conductor 622 and/or the third electrical conductor 633 each have at least the one flat outer surface 626; they are each realized as a flat busbar. The semiconductor material of the first thyristor 701 is arranged in the disk-shaped semiconductor wafer 635 and the disk-shaped semiconductor wafer 635 is arranged in parallel with at least one of the flat outer surfaces 626. In particular, the disk-shaped semiconductor wafer 635 is arranged in parallel with the flat outer surface 626 of the second electrical conductor 622. As a result, the magnetic field that changes over time can permeate the semiconductor material of the first thyristor particularly well, such that a current (which acts as gate current) can be induced reliably in the semiconductor material of the first thyristor.

FIG. 7 illustrates the module 201 comprising an exemplary power semiconductor circuit 605, the thyristor element 630 and the electrical energy storage unit 210.

In the exemplary embodiment, the electrical energy storage unit 210 is an electrical capacitor 210, more specifically a unipolar electrical capacitor (comprising a positive capacitor terminal (+) and a negative capacitor terminal (−)). The first electrical conductor 621 is a positive electrical conductor; the second electrical conductor 622 is a negative electrical conductor. However, in other exemplary embodiments, the energy storage unit 210 may also be a different energy storage unit, for example a different type of capacitor, an electrical battery or an electrical storage battery. The thyristor element 630 has an antiparallel circuit composed of the first thyristor 701 and the second thyristor 702; the first thyristor 701 and the second thyristor 702 are thus connected in antiparallel. The thyristor element 630 can also be referred to as a bidirectional thyristor element or as a bidirectional thyristor.

In the exemplary embodiment, the first thyristor 701 and the second thyristor 702 are in the form of a single semiconductor component 630. The thyristor element 630 constitutes a semiconductor component of this type. In this case, in particular, the first thyristor 701 and the second thyristor 702 are (jointly) integrated in the (single or joint) semiconductor wafer 635. As an alternative, however, a respective distinct semiconductor wafer can also be provided for the first thyristor and the second thyristor. A semiconductor component that has two thyristors in an antiparallel circuit is known per se to a person skilled in the art.

The power semiconductor circuit 605 has the first electronic switching element 202, the second electronic switching element 206, the first diode 204 and the second diode 208. It can be seen that the first module terminal 212 is electrically connected to the third electrical conductor 623. The second module terminal 215 is electrically connected to the second electrical conductor 622.

The first module terminal 212 is connected to the connecting point between the first electronic switching element 202 and the second electronic switching element 206. The terminal of the first switching element 202, which is opposite the connecting point, (in this case: the collector) is electrically connected to the first conductor 621. The second diode 208 and the second electronic switching element 206 are connected between the first module terminal 212 and the second module terminal 215. The first module terminal 212 is connected to the cathode of the second diode 208; the second module terminal 215 is connected to the anode of the second diode 208.

The thyristor element 630 has the first thyristor 701 and the second thyristor 702, wherein the first thyristor 701 and the second thyristor 702 are connected in antiparallel (antiparallel circuit). One terminal of the antiparallel circuit is electrically connected to the third electrical conductor 623; the other terminal of the antiparallel circuit is electrically connected to the second electrical conductor 622.

The anode (anode terminal) of the first thyristor 701 is electrically connected to the third electrical conductor 623. The cathode (cathode terminal) of the first thyristor 701 is electrically connected to the second electrical conductor 622.

In the exemplary embodiment, the gate (gate terminal) of the first thyristor 701 is not wired. In other words, said gate is open, that is to say it is not connected to other components.

When the second thyristor 702 is switched on (ignited), then a current flows from the second electrical conductor 622 through the thyristor element 630 to the third electrical conductor 623. The direction 705 of the current flow is illustrated by an arrow.

When the first thyristor 701 is switched on (ignited), then the current flows from the third electrical conductor 623 through the thyristor element 630 to the second electrical conductor 622. That is to say the current then flows in the opposite direction to the direction of the arrow 705. When both thyristors 701 and 702 are switched on, the current can then flow in both directions through the thyristor element 630. This is then for example also the case when the first thyristor or the second thyristor has broken down (due to a high current flow and the resulting heat in the semiconductor material); then a current flow in both directions as possible. This is illustrated by a second arrow 708, symbolizing two directions 708 of the current.

In the event of a fault, the following method proceeds in the case of the module 201: as a starting point, it is assumed that the electrical energy storage unit 210 is charged. The thyristors 701 and 702 are switched off (not ignited), that is to say the thyristors 701 and 702 block the current flow. A fault subsequently arises in the power semiconductor circuit 605 (that is to say a fault inside the module): for example, the first electronic switching element 202 and the second electronic switching element 206 simultaneously become electrically conductive (incorrectly); what is known as a bridge short circuit arises in the half-bridge formed by the first electronic switching element 202 and the second electronic switching element 206. As a result, the electrical energy storage unit 210 is short-circuited and a discharge current 715 suddenly begins to flow.

The discharge current 715 initially flows starting from the positive terminal of the energy storage unit 210 via the first electrical conductor 621 to the power semiconductor circuit 605. There, the discharge current 715 flows via the first electronic switching element 202 and the second electronic switching element 206. The discharge current 715 then flows via the second electrical conductor 622 back to the negative terminal of the energy storage unit 210. In this case, the discharge current has respectively opposite directions in the first electrical conductor 621 and in the second electrical conductor 622. The discharge current 715 is only limited by stray capacitances and ohmic resistances, which arise in the first electrical conductor, the second electrical conductor and the power semiconductor circuit 605. The discharge current 715 therefore increases relatively quickly.

A magnetic field that changes over time is produced around the first electrical conductor 621 due to the (increasing) discharge current 715. A magnetic field that changes over time is also produced around the second electrical conductor 622 due to the discharge current 715. These two magnetic fields overlap and permeate both the thyristor element 630 and thus the semiconductor material of the first thyristor 701 and the second thyristor 702. The thyristors 701 and 702 are specifically physically adjacent to the first electrical conductor 621 and to the second electrical conductor 622. In particular, the thyristors 701 and 702 are physically adjacent to the second electrical conductor 622. The thyristors 701 and 702 have an external housing made of anti-magnetic material, which does not prevent or only slightly prevents the magnetic field that permeates the thyristors 701 and 702.

A current, for example an eddy current, is induced in particular in the semiconductor material of the first thyristor 701 by the magnetic field that changes over time. This current acts as a gate current (internal gate current, inner gate current) or ignition current and causes the first thyristor 701 to switch on (that is to say causes the first thyristor 701 to ignite). The first thyristor 701 then electrically connects the third electrical conductor 623 to the second electrical conductor 622. As a result, the first thyristor 701 electrically connects the first module terminal 212 to the second module terminal 215. In other words, the first thyristor 701 short-circuits the first module terminal 212 with the second module terminal 215. In the exemplary embodiment, the first thyristor 701 thus operates as a bypass switch. In the event of a fault arising inside the module, resulting in a sudden discharge of the energy storage unit 201, the first thyristor 701 ignites (that is to say the bypass switch 701 closes) and thereby bypasses the module 201. The module 201 is then no longer active in the respective module series circuit; the converter can continue to operate without this module.

The thyristor 701 breaks down due to the high discharge current 715 and is subsequently permanently conductive in both directions (even without a gate current flowing). This results in a conduct-on-fail response of the first thyristor 701.

After the first thyristor 701 has broken down, the first thyristor 701 or the thyristor element 630 can optionally be (further) cooled. A water cooling system for example can be used for this purpose. For example, a surface of the second electrical conductor 622 can be cooled by means of the water cooling system, which indirectly also cools the first thyristor 701 or the thyristor element 630. In particular, the surface of the second electrical conductor 622 that is opposite the outer surface 626 of the second electrical conductor 622 can be cooled. The other power electronics components of the module 201 can of course also be cooled, for example by means of the water cooling system.

The first thyristor 701 is thus switched on by the induced current (eddy current). The gate (the gate terminal) of the first thyristor 701 can be unwired in this case. The gate does not even need to be fed out of the housing of the thyristor element 630. The first thyristor 701 is in particular switched on by the induced current (gate current or ignition current) only when the change in the magnetic field over time exceeds a predetermined threshold value. The deciding factor in this case is the change in the magnetic field over time at the location of the semiconductor material of the first thyristor. Particularly large changes in the magnetic field over time can be realized at the semiconductor material of the first thyristor when the first thyristor is arranged very close to the second electrical conductor 622. In other words, the first thyristor 701 is switched on by the induced current (gate current or ignition current) when the change in the discharge current over time (in particular in the second electrical conductor 622) exceeds a threshold value. This threshold value may be for example a value between 5 and 50 kA per µs.

As an alternative to the unwired gate (or the gate that is not even fed out of the thyristor housing), the gate may also be closed by means of a constant impedance other than zero. As a further alternative, however, a drive unit may also be connected to the gate, said drive unit feeding a gate current into the gate of the first thyristor 701 in the case of a discharge-free fault (that is to say in the case of a fault that is not associated with discharging of the energy storage unit 210 or with a short-circuit-like discharge current 715 of the energy storage unit). A discharge-free fault of this kind may be for example overcharging of the energy storage unit 210, which although does not directly lead to a short-circuit-like discharge current 715, it should still be avoided.

The second thyristor 702 can then be ignited (switched on) in a known manner when a short circuit arises due to a fault on the DC side of the converter and the short-circuit current threatens to overload the second diode 208. The second thyristor 702 then relieves the second diode 208 of the load by virtue of a large portion of the short-circuit current flowing via the thyristor 702.

The invention has been explained using the example of a half-bridge module. In other exemplary embodiments, however, other modules of a modular multilevel converter can also be designed in a similar manner, for example other types of half-bridge module or a full-bridge module.

In the module, the bypass switch and the load relief circuit for the diode are combined in the thyristor element 630, that is to say advantageously in one single element. The thyristor element 630 is arranged in the DC voltage busbar region 625 of the module. This achieves automatic self-ignition of the first thyristor in the event of a sudden discharge of the energy storage unit (for example in the event of what is known as DC link discharge). The module is bypassed as a result; it is subsequently no longer effective in the series circuit of modules in the converter (in the respective phase module branch). The first thyristor breaks down at the same time and is permanently conductive in both directions as a result. The first thyristor thus implements a conduct-on-fail function. This produces a permanent bypass path, such that the branch current of the converter can continue to flow. The converter can thus continue to operate, in particular even when the module is damaged and therefore no longer functions properly.

A description has been given of a module of a modular multilevel converter that in particular can be of a compact design and in which modules are reliably bypassed in the event of a fault arising inside a module.

Reference Signs

1 Multilevel converter
5 First AC voltage terminal
7 Second AC voltage terminal

9 Third AC voltage terminal
11 First phase module branch
13 Second phase module branch
15 First phase module
16 First DC voltage terminal
17 Second DC voltage terminal
18 Third phase module branch
21 Fourth phase module branch
24 Second phase module
27 Fifth phase module branch
29 Sixth phase module branch
31 Third phase module
35 Control device
37 Communication connection
1_1 . . . 6_n Modules
201 Module
202 First electronic switching element
204 First antiparallel-connected diode
206 Second electronic switching element
208 Second antiparallel-connected diode
210 Electrical energy storage unit
212 First module terminal
215 Second module terminal
220 Module control device
301 Module
302 Third electronic switching element
304 Third antiparallel-connected diode
306 Fourth electronic switching element
308 Fourth antiparallel-connected diode
315 Second module terminal
401 High-voltage direct current transmission system
405 High-voltage direct current connection
405*a* First high-voltage direct current line
405*b* Second high-voltage direct current line
501 Reactive power compensator
505, 507, 509 Phase modules
511 AC voltage network
515, 517, 519 Phase lines
603 Housing
605 Power semiconductor circuit
621 First electrical conductor
622 Second electrical conductor
623 Third electrical conductor
624 Energy storage unit housing
625 DC voltage busbar region
626 Flat outer surface
630 Thyristor element
632 Disk-type thyristor housing
635 Semiconductor wafer
701 First thyristor
702 Second thyristor
705 Direction of current flow
708 Directions of current flow
715 Discharge current

The invention claimed is:

1. A module of a modular multilevel converter, the module comprising:

a first module terminal, a second module terminal, a first electrical conductor, a second electrical conductor, a third electrical conductor, a power semiconductor circuit and an electrical energy storage unit;

said power semiconductor circuit having a first electronic switching element and a second electronic switching element, a first diode connected antiparallel with said first electronic switching element and a second diode connected antiparallel with said second electronic switching element;

said power semiconductor circuit being connected to said energy storage unit by said first electrical conductor and said second electrical conductor;

said first module terminal being connected to said third electrical conductor; and a first thyristor and a second thyristor connected between said third electrical conductor and said second electrical conductor, said first thyristor and said second thyristor forming an antiparallel circuit;

said first thyristor being disposed between said first electrical conductor and said second electrical conductor in such a way that a current switching on said first thyristor is induced in semiconductor material due to a magnetic field changing over time, said magnetic field arising due to a discharge current of said energy storage unit flowing through at least one of said first electrical conductor or said second electrical conductor and permeating said semiconductor material of said first thyristor.

2. The module according to claim 1, wherein said third electrical conductor is disposed between said first electrical conductor and said second electrical conductor.

3. The module according to claim 1, wherein said first thyristor and said second thyristor are disposed between said third electrical conductor and said second electrical conductor.

4. The module according to claim 1, wherein said first thyristor and said second thyristor are mechanically braced between said third electrical conductor and said second electrical conductor.

5. The module according to claim 1, wherein said first thyristor and said second thyristor are disposed between said first electrical conductor and said second electrical conductor.

6. The module according to claim 1, wherein said first thyristor and said second thyristor form a semiconductor component.

7. The module according to claim 6, wherein said semiconductor component has a disk-shaped thyristor housing.

8. The module according to claim 1, wherein at least one of said first electrical conductor, said second electrical conductor or said third electrical conductor is formed as a busbar.

9. The module according to claim 1, wherein said first electronic switching element and said second electronic switching element are interconnected to form a half-bridge circuit.

10. A modular multilevel converter, comprising a plurality of modules according to claim 1.

11. A module of a modular multilevel converter, the module comprising:

a first module terminal, a second module terminal, a first electrical conductor, a second electrical conductor, a third electrical conductor, a power semiconductor circuit and an electrical energy storage unit;

said power semiconductor circuit having a first electronic switching element and a second electronic switching element, a first diode connected antiparallel with said first electronic switching element and a second diode connected antiparallel with said second electronic switching element;

said power semiconductor circuit being connected to said energy storage unit by said first electrical conductor and said second electrical conductor;

said first module terminal being connected to said third electrical conductor;

a first thyristor and a second thyristor connected between said third electrical conductor and said second electrical conductor, said first thyristor and said second thyristor forming an antiparallel circuit;

said first thyristor being integrated in a semiconductor wafer, or said first thyristor and said second thyristor being integrated in a semiconductor wafer;

at least one of said first electrical conductor, said second electrical conductor or said third electrical conductor having a flat outer surface, said semiconductor wafer being disk-shaped, said first thyristor having semiconductor material disposed in said disk-shaped semiconductor wafer, and said disk-shaped semiconductor wafer being disposed in parallel with at least one said flat outer surface.

12. A method for discharging an electrical energy storage unit in a module of a modular multilevel converter, the method comprising:

providing the module with a first module terminal, a second module terminal, a first electrical conductor, a second electrical conductor, a third electrical conductor, a power semiconductor circuit and an electrical energy storage unit;

providing the power semiconductor circuit with a first electronic switching element and a second electronic switching element, a first diode connected antiparallel with the first electronic switching element and a second diode connected antiparallel with the second electronic switching element;

using the first electrical conductor and the second electrical conductor to connect the power semiconductor circuit to the energy storage unit;

connecting the first module terminal to the third electrical conductor;

connecting a first thyristor and a second thyristor between the third electrical conductor and the second electrical conductor, the first thyristor and the second thyristor forming an antiparallel circuit;

inducing a current switching on the first thyristor in semiconductor material due to a magnetic field changing over time, the magnetic field arising due to a discharge current of the energy storage unit flowing through at least one of the first electrical conductor or the second electrical conductor and permeating the semiconductor material of the first thyristor;

immediately discharging the energy storage unit upon a fault arising in the module, resulting in the discharge current of the energy storage unit beginning to flow; and short-circuiting the first module terminal and the second module terminal by the switched-on first thyristor.

* * * * *